(12) United States Patent
Arar et al.

(10) Patent No.: US 11,934,955 B2
(45) Date of Patent: *Mar. 19, 2024

(54) NEURAL NETWORK BASED FACIAL ANALYSIS USING FACIAL LANDMARKS AND ASSOCIATED CONFIDENCE VALUES

(71) Applicant: NVIDIA Corporation, Santa Clara, CA (US)

(72) Inventors: Nuri Murat Arar, Zurich (CH); Niranjan Avadhanam, Saratoga, CA (US); Nishant Puri, San Francisco, CA (US); Shagan Sah, Santa Clara, CA (US); Rajath Shetty, Santa Clara, CA (US); Sujay Yadawadkar, Santa Clara, CA (US); Pavlo Molchanov, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/051,296

(22) Filed: Oct. 31, 2022

(65) Prior Publication Data

US 2023/0078171 A1 Mar. 16, 2023

Related U.S. Application Data

(63) Continuation of application No. 17/004,252, filed on Aug. 27, 2020, now Pat. No. 11,487,968.
(Continued)

(51) Int. Cl.
*G06N 3/08* (2023.01)
*G06F 18/21* (2023.01)
(Continued)

(52) U.S. Cl.
CPC ............. *G06N 3/08* (2013.01); *G06F 18/214* (2023.01); *G06F 18/2193* (2023.01);
(Continued)

(58) Field of Classification Search
CPC ............. G06K 9/6256; G06K 9/00281; G06K 9/00979; G06K 9/6265; G06K 9/00208;
(Continued)

(56) References Cited

U.S. PATENT DOCUMENTS 10,885,698 B2  1/2021 Muthler et al.
11,487,968 B2  11/2022 Arar et al.
(Continued)

FOREIGN PATENT DOCUMENTS

CN   102887121 A   1/2013
CN   106662925 A   5/2017
(Continued)

OTHER PUBLICATIONS

IEC 61508, "Functional Safety of Electrical/Electronic/Programmable Electronic Safety-related Systems," https://en.wikipedia.org/wiki/IEC_61508, accessed on Apr. 1, 2022, 7 pgs.
(Continued)

*Primary Examiner* — Stephen P Coleman
(74) *Attorney, Agent, or Firm* — Taylor English Duma L.L.P.

(57) ABSTRACT

Systems and methods for more accurate and robust determination of subject characteristics from an image of the subject. One or more machine learning models receive as input an image of a subject, and output both facial landmarks and associated confidence values. Confidence values represent the degrees to which portions of the subject's face corresponding to those landmarks are occluded, i.e., the amount of uncertainty in the position of each landmark location. These landmark points and their associated confi-
(Continued)

dence values, and/or associated information, may then be input to another set of one or more machine learning models which may output any facial analysis quantity or quantities, such as the subject's gaze direction, head pose, drowsiness state, cognitive load, or distraction state.

20 Claims, 9 Drawing Sheets

Related U.S. Application Data

(60) Provisional application No. 62/948,796, filed on Dec. 16, 2019.

(51) Int. Cl.

| | |
|---|---|
| *G06F 18/214* | (2023.01) |
| *G06N 20/00* | (2019.01) |
| *G06V 10/764* | (2022.01) |
| *G06V 10/774* | (2022.01) |
| *G06V 10/82* | (2022.01) |
| *G06V 10/94* | (2022.01) |
| *G06V 20/59* | (2022.01) |
| *G06V 20/64* | (2022.01) |
| *G06V 40/16* | (2022.01) |
| *G06V 40/18* | (2022.01) |

(52) U.S. Cl.
CPC .......... *G06N 20/00* (2019.01); *G06V 10/764* (2022.01); *G06V 10/774* (2022.01); *G06V 10/82* (2022.01); *G06V 10/95* (2022.01); *G06V 20/597* (2022.01); *G06V 20/647* (2022.01); *G06V 40/171* (2022.01); *G06V 40/193* (2022.01)

(58) Field of Classification Search
CPC ............ G06K 9/00845; G06K 9/0061; G06K 9/6271; G06N 20/00
USPC ........................................................ 382/104
See application file for complete search history.

(56) References Cited

U.S. PATENT DOCUMENTS

| | | | |
|---|---|---|---|
| 11,657,263 | B2 | 5/2023 | Arar et al. |
| 2014/0270374 | A1 | 9/2014 | Unzueta |
| 2016/0027218 | A1 | 1/2016 | Salter et al. |
| 2016/0063720 | A1 | 3/2016 | Han et al. |
| 2016/0202756 | A1 | 7/2016 | Wu et al. |
| 2017/0043712 | A1 | 2/2017 | Paszkowicz et al. |
| 2018/0047288 | A1 | 2/2018 | Cordell et al. |
| 2018/0239361 | A1* | 8/2018 | Micks .............. B60W 60/0011 |
| 2019/0080149 | A1* | 3/2019 | Gernoth .............. G06V 40/166 |
| 2019/0080419 | A1 | 3/2019 | Yazdi et al. |
| 2019/0213429 | A1 | 7/2019 | Sicconi et al. |
| 2019/0278108 | A1 | 9/2019 | Ang et al. |
| 2021/0104068 | A1* | 4/2021 | Marks ..................... G06N 3/04 |
| 2023/0244941 | A1 | 8/2023 | Arar et al. |

FOREIGN PATENT DOCUMENTS

| | | |
|---|---|---|
| CN | 107622240 A | 1/2018 |
| CN | 107665330 A | 2/2018 |
| CN | 107808147 A | 3/2018 |
| CN | 107871134 A | 4/2018 |
| CN | 108090470 A | 5/2018 |
| CN | 108171218 A | 6/2018 |
| CN | 109583338 A | 4/2019 |
| CN | 109849788 A | 6/2019 |
| CN | 109886153 A | 6/2019 |
| CN | 109906165 A | 6/2019 |
| CN | 109923466 A | 6/2019 |

OTHER PUBLICATIONS

ISO 26262, "Road vehicle—Functional safety," International standard for functional safety of electronic system, https://en.wikipedia.org/wiki/ISO_26262, accessed on Sep. 13, 2021, 8 pgs.
"Taxonomy and Definitions for Terms Related to Driving Automation Systems for On-Road Motor Vehicles", Society of Automotive Engineers (SAE), Standard No. J3016-201609, pp. 30 (Sep. 30, 2016).
"Taxonomy and Definitions for Terms Related to Driving Automation Systems for On-Road Motor Vehicles", Society of Automotive Engineers (SAE), Standard No. J3016-201806, pp. 35 (Jun. 15, 2018).
"Conservative Control for Zone Driving of Autonomous Vehicles Using Safe Time of Arrival", U.S. Appl. No. 62/628,831, filed Feb. 9, 2018.
"Convolutional Neural Networks to Detect Drivable Freespace for Autonomous Vehicles", U.S. Appl. No. 62/643,665, filed Mar. 15, 2018.
"Methodology of Using a Single Controller (ECU) for a Fault-Tolerant/Fail-Operational Self-Driving System", U.S. Appl. No. 62/524,283, filed Jun. 23, 2017.
"Methods for accurate real-time object detection and for determining confidence of object detection suitable for D autonomous vehicles", U.S. Appl. No. 62/631,781, filed Feb. 18, 2018.
"Pruning Convolutional Neural Networks for Autonomous Vehicles and Robotics", U.S. Appl. No. 62/630,445, filed Feb. 14, 2018.
"System and Method for Autonomous Shuttles, Robo-Taxis, Ride-Sharing and On-Demand Vehicles", U.S. Appl. No. 62/635,503, filed Feb. 26, 2018.
"System and Method for Controlling Autonomous Vehicles", U.S. Appl. No. 62/614,466, filed Jan. 17, 2018.
"System and Method for Sharing Camera Data Between Primary and Backup Controllers in Autonomous Vehicle Systems", U.S. Appl. No. 62/629,822, filed Feb. 13, 2018.
"System and Methods for Advanced AI-Assisted Vehicles", U.S. Appl. No. 62/648,358, filed Mar. 26, 2018.
"Detection of Hazardous Autonomous Driving Using Machine Learning," U.S. Appl. No. 62/622,538, filed Jan. 26, 2018.
U.S. Appl. No. 62/522,520, filed Jun. 20, 2017.
U.S. Appl. No. 15/836,549, filed Nov. 10, 2017.
U.S. Appl. No. 62/742,923, filed Oct. 8, 2018.
U.S. Appl. No. 62/439,870, filed Dec. 26, 2018.
U.S. Appl. No. 16/363,648, filed Mar. 25, 2019.
U.S. Appl. No. 62/948,789, filed Dec. 16, 2019.
Hassner, T., et al., "Effective Face Frontalization in Unconstrained Images", In Proceedings of the IEEE Conference on Computer Vision and Pattern Recognition (2015) 10 pgs.
Kahou, S.E., et al.; "Combining Modality Specific Deep Neural Networks for Emotion Recognition in Video"; In Proceedings of the 15th ACM on International Conference on Multimodal Interaction (ICMI), Dec. 9-13, 2013; 8 pgs.
Liu, Y., et al.; "Exploring Disentagled Feature Representation Beyond Face Identification"; In Proceedings of the IEEE Conference on Computer Vision and Pattern Recognition, 2018, 10 pgs.
Park, S., et al.; "Few-Shot Adaptive Gaze Estimation"; arXiv:1905.01941v2, Oct. 14, 2019, 13 pgs.
Yang, T-Y., et al.; "FSA-Net: Learning Fine-Grained Structure Aggregation for Head Pose Estimation from a Single Image"; In Proceedings of the IEEE Conference on Computer Vision and Pattern Recognition, 2019, 10 pgs.
Zhu, M., et al.; "Robust Facial Landmark Detection via Occlusion-adaptive Deep Networks"; In Proceedings of the IEEE Conference on Computer Vision and Pattern Recognition, 2019, 11 pgs.
Zhu, X., et al.; "Face Alignment in Full Pose Range: A 3D Total Solution"; IEEE Transactions on Pattern Analysis and Machine Intelligence, vol. 41, No. 1, 2017; 14 pgs.
Arar Murat, Nuri; First Office Action for Chinese Patent Application No. 202011474336.3, filed Dec. 14, 2020, dated Sep. 27, 2023, 11 pgs.
Arar, Nuri Murat; Final Office Action for U.S. Appl. No. 17/005,914, filed Aug. 28, 2020, dated Nov. 28, 2022, 7 pgs.

(56) References Cited

OTHER PUBLICATIONS

Arar, Nuri Murat; Notice of Allowance for U.S. Appl. No. 17/005,914, filed Aug. 28, 2020, dated Jan. 20, 2023, 9 pgs.
"Systems and Methods for Safe and Reliable Autonomous Vehicles" U.S. Appl. No. 62/584,549, filed Nov. 10, 2017.
"System and Method for Controlling Autonomous Vehicles", U.S. Appl. No. 62/614,466, filed Jan. 7, 2018.
"System and Method for Safe Operation of Autonomous Vehicles", U.S. Appl. No. 62/625,351, filed Feb. 2, 2018.
Non-Final Office Action dated Aug. 18, 2021 in U.S. Appl. No. 17/004,252, 9 pgs.
Notice of Allowance for U.S. Appl. No. 17/004,252, filed Aug. 27, 2020, dated Jan. 13, 2022, 9 pgs.
Arar, Nuri Murat ; First Office Action for Chinese Patent Application No. 202011400019.7, filed Dec. 2, 2020, dated Sep. 29, 2023, 14 pgs.
Murat Arar, Nuri; Second Office Action for Chinese Patent Application No. 202011474336.3, filed Dec. 14, 2020, dated Dec. 27, 2023, 8 pgs.

* cited by examiner

NEURAL NETWORK BASED FACIAL ANALYSIS USING FACIAL LANDMARKS AND ASSOCIATED CONFIDENCE VALUES

CROSS REFERENCE TO RELATED APPLICATION

This application is a continuation of U.S. patent application Ser. No. 17/004,252, filed Aug. 27, 2020, which claims the benefit of U.S. Provisional Patent Application No. 62/948,796, filed Dec. 16, 2019. Each of which is hereby incorporated by reference herein in its entirety.

BACKGROUND

Recent convolutional neural networks (CNNs) have been developed to estimate gaze direction of subjects. Such CNNs can, for example, determine the direction a subject is looking, from an input image of the subject. This allows systems using such CNNs to track subject gaze and react accordingly in real time.

Conventional gaze determination systems are not without their drawbacks, however. Overall performance and robustness of such systems remains limited, especially in edge cases or extreme situations such as large variations in head pose or partial occlusion of faces or eyes. FIG. 1 illustrates examples of such extreme situations. More specifically, FIG. 1 shows situations in which the subject's face is partially or mostly occluded (left), in this case by a respiratory mask, and in which the subject has turned her head far to one direction (right). In both examples, much of the subject's face cannot be seen (in the leftmost figure, the entirety of the subject's face below his eyes; in the rightmost figure, the entire right side of the subject's face), meaning much information on the subjects' faces is unavailable for sensing. This leaves limited information available for CNNs to determine face pose, resulting in often inaccurate results.

SUMMARY

Accordingly, systems and methods are described herein for conducting machine learning based facial analysis in more accurate and efficient manner. In one embodiment of the disclosure, one or more machine learning models are used to determine both facial landmarks and associated confidence values, where confidence values represent the degrees to which portions of the subject's face corresponding to those landmarks are occluded, i.e., the amount of uncertainty in the position of each landmark location. These landmark points and their associated confidence values may then be used to monitor the state of the subject. For example, landmark points and associated confidence values may be input to another set of one or more machine learning models, which may output any quantity or quantities characterizing the subject, such as the subject's gaze direction, head pose, drowsiness state, cognitive load, or distraction state.

Embodiments of the disclosure include a feedback mechanism wherein determined confidence values are used to improve the input image by selecting portions of the image corresponding to higher confidence values. These image portions may be deemed more reliable in generating accurate landmark values. Accordingly, image portions of greater reliability may be input to the one or more machine learning models, producing more accurate landmark and confidence values. In some embodiments, only the image portions corresponding to higher confidence values may be input to the one or more machine learning models, so that portions with low confidence values are disregarded and any resulting output is improved. This process may be repeated as desired to yield further improved landmark and confidence values, which may in turn be used to generate improved estimates of various properties of the subject.

Embodiments of the disclosure also include using only those landmark values that have confidence values corresponding to a portion of the subject that is not occluded. That is, embodiments may use only those landmarks which are from non-occluded portions of the subject, and which thus have higher confidence values. In this manner, more accurate and efficient determination of subject properties such as gaze direction, head pose, drowsiness, and the like may be made. To accomplish this, only those landmark values from non-occluded portions of the subject may be input to the machine learning models that determine characteristics of the subject (e.g., the subject's gaze direction, head pose, drowsiness state, cognitive load, distraction state, or the like).

Weight values may also be assigned to each landmark point according to its corresponding confidence value, with landmark points of greater confidence being assigned greater weights. That is, assigned weight values may be inversely proportional to the level of occlusion of the corresponding portions of the subject. Those machine learning models that determine characteristics of the subject may be trained to consider these weight values along with their landmarks, to further improve the accuracy of systems according to embodiments of the disclosure.

Subject characteristics or states determined by the above systems may be used in any manner. In particular, a subject's gaze direction may be used in numerous different applications, including in autonomous vehicles and augmented reality headsets. As one example, the state of the subject may be used to initiate an operation such as a vehicle operation. For instance, if it is determined that a driver is not directing his or her gaze toward the road, a warning message may be initiated, directing the driver to focus on the road. Embodiments of the disclosure contemplate initiation of any type of operation responsive to any determined characteristic of state of the subject.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for more accurate and robust determination of subject characteristics from an image of the subject. One or more machine learning models receive as input an image of a subject, and output both facial landmarks and associated confidence values. Confidence values represent the degrees to which portions of the subject's face corresponding to those landmarks are occluded, i.e., the amount of certainty in the position of each landmark location. These landmark points and their associated confidence values, and/or associated information, may then be input to another set of one or more machine learning models which may output any facial analysis quantity or quantities, such as the subject's gaze direction, head pose, drowsiness state, cognitive load, or distraction state.

Figure 1:
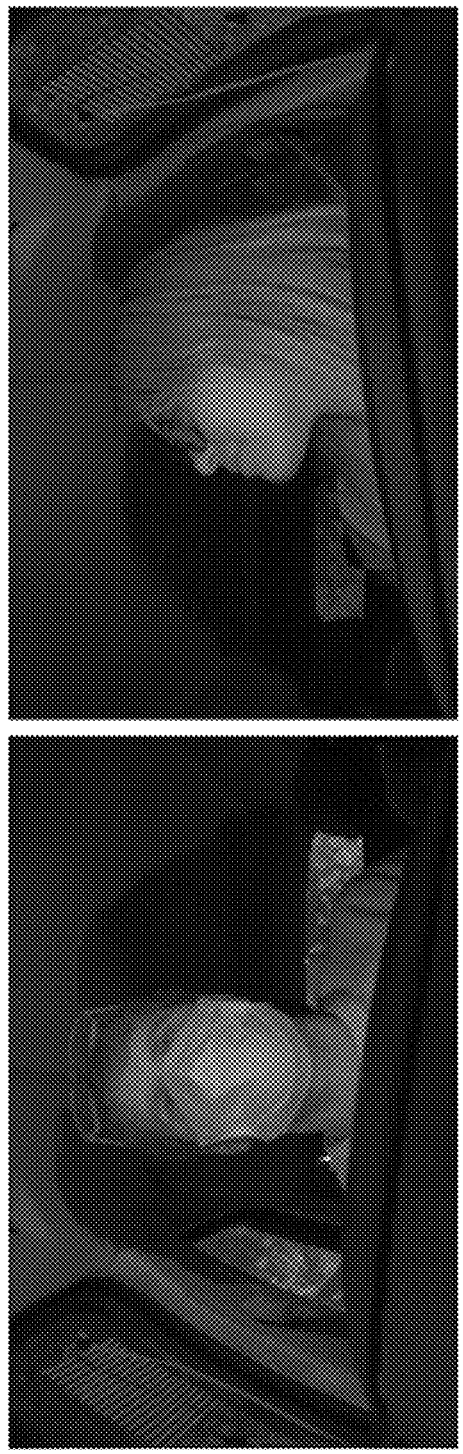
FIG. 1 conceptually illustrates occlusion of a subject's face.
Figure 2:
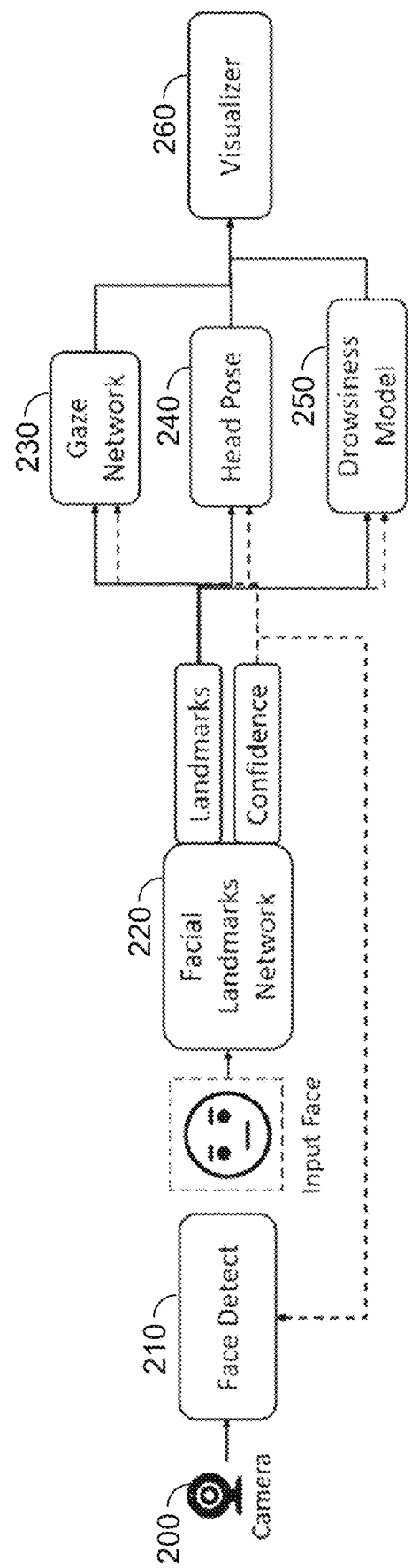
FIG. 2 is a block diagram illustrating operation of a system for determining and using landmark and confidence values of a subject, according to embodiments of the disclosure.

FIG. 2 is a block diagram illustrating an exemplary machine learning model based architecture for determining landmark points and associated confidence values of embodiments of the disclosure. The model includes a face detection module 210, a facial landmarks network 220 that outputs landmark values and associated confidence values, and any number of machine learning models or networks that determine output quantities from landmark and confidence value inputs.

The system of FIG. 2 also includes a sensor such as a camera 200 which captures images of a subject such as a person whose gaze direction is to be determined. The camera 200 transmits image data from captured images to the face detection module 210, which detects the face of the subject in the image. The face detection module 210 may be any software module or set of instructions capable of locating subject faces within an image using any method or process, including known computer vision-based face detection processes that detect faces without using neural networks, such as edge detection methods, feature searching methods, probabilistic face models, graph matching, histograms of oriented gradients (HOGs) fed into classifiers such as support vector machines, HaarCascade classifiers, and the like. Determining face location may also be performed using neural network-based facial recognition methods such as those employing deep neural network (DNN) facial recognition schemes, as well as any others.

Detected faces may then be cropped for input to the facial landmarks network 220. In this manner, a portion of the image or image data from the camera is selected for input to the facial landmarks network 220. Sections of the image may be selected, for example, by cropping the identified face according to a bounding box which may be drawn in known manner.

The cropped face portion is transmitted to the facial landmarks network 220, which determines facial landmarks and corresponding confidence values therefrom. The facial landmarks network 220 may be any machine learning network, e.g., any one or more machine learning models, capable of determining facial landmarks from an input image of a face. Such networks may include machine learning models built according to holistic methods to represent global facial appearance and shape information, models build according to constrained local model methods that build local appearance models in addition to utilizing global shape models, generative networks, CNNs, and regression-based models that determine landmark positions as functions of facial shape and appearance information. Many such models are known, and embodiments of the disclosure contemplate use of any one or more such models, or any other suitable models or methods, to determine facial landmarks from an input image of a face. Models may be constructed using any architecture and methods suitable for determining facial landmarks from input images of faces. For example, facial landmarks networks based on CNNs may be structured using any convolution kernels and pooling layers suitable for extracting features of a face for determination of corresponding landmark points.

The models may further be modified to generate as output a confidence value for each output facial landmark. Such confidence values correspond to detection probabilities of each landmark, that is, the likelihood that a landmark point is actually located at the facial feature that it is supposed to represent. The probability or confidence value of each landmark may thus indicate the level of occlusion for that particular facial region, as greater occlusion (i.e., lower visibility) of a facial feature corresponds to lower likelihood of correctly placing a landmark at that feature. As one example, when the facial landmarks network employs a classifier to determine landmark positions, confidence values may be or correspond to confidence scores generated by the classifier in determining landmark classifications.

For an input image of a subject face, the outputs of the facial landmarks network 220 of FIG. 2 may thus be a set of landmark points, i.e., two-dimensional positions of features of the subject's face, and a confidence value for each landmark point. These outputs are then sent to any number and type of networks, models, or other software modules, to serve as input. Such networks may include, as examples, a gaze network 230 for determining the gaze direction of the subject, a head pose network 240 for determining the head pose of the subject in the image, and a drowsiness model 250 for determining a likelihood that the subject is in a sleeping or incapacitated state. Embodiments of the disclosure also contemplate any other networks that may have facial landmarks as inputs. Confidence values may also be input to face detection module 210 as a form of feedback, to improve the selection of face portions and thus improve the generation of landmark points. In particular, face detection module 210 may select only those face portions which correspond to sufficiently high confidence values, i.e., may select only sufficiently non-occluded portions of the subject's face for drawing of bounding boxes and face cropping. This may result in more accurate or reliable determination of landmark points.

An exemplary gaze network 230 as shown in FIG. 2 may be any network that determines a subject's gaze direction from at least landmark points of the subject's face. As one example, the gaze network 230 may be one or more machine learning models constructed to receive both landmark values and corresponding confidence values as inputs, and to output a gaze direction. Such networks may include known gaze networks configured to receive landmark values as input, where these networks are modified to take in confidence values as an additional input. Confidence values may then be used, for instance, to alter weights of features determined from input landmarks or weights of the input landmarks themselves (with weight values of input landmarks being generally inversely proportional to the level of occlusion associated with the landmarks, i.e., proportional to their corresponding confidence values) to reduce the contribution of features corresponding to landmark points having low confidence value, and/or to increase the contribution of features corresponding to landmark points having higher confidence values. As another example, the gaze network 230 may be one or more machine learning models constructed to receive landmark values as input but not confidence values. In this latter example, the confidence values may be used to filter out landmark points of insufficient confidence, prior to input to the gaze network. That is, the confidence values may be used as a filter prior to gaze network input, so that only those landmark points having sufficient confidence values are input to the gaze network 230. In this manner, a gaze network 230 may consider only non-occluded regions of the subject's face when determining gaze, thus generating more accurate results. This may produce more accurate results as compared to conventional gaze detection models, which do not possess the ability to discriminate between occluded and non-occluded regions of a face when determining gaze.

An exemplary head pose network 240 as shown in FIG. 2 may be any network that determines a subject's head pose from at least landmark points of the subject's face. As one example, the head pose network 240 may be one or more machine learning models constructed to receive both landmark values and corresponding confidence values as inputs, and to output head pose values. Such networks may include known head pose networks configured to receive landmark values as input, where these networks are modified to take in confidence values as an additional input. Confidence values may then be used, for instance, to alter weights of features determined from input landmarks or weights of the input landmarks themselves (with weight values of input landmarks being generally inversely proportional to the level of occlusion associated with the landmarks, i.e., proportional to their corresponding confidence values) to reduce the contribution of features corresponding to landmark points having low confidence value, and/or to increase the contribution of features corresponding to landmark points having higher confidence values. As another example, the head pose network 240 may be one or more machine learning models constructed to receive landmark values as input but not confidence values. In this latter example, the confidence values may be used to filter out landmark points of insufficient confidence, prior to input to the head pose network. That is, the confidence values may be used as a filter prior to head pose network 240 input, so that only those landmark points having sufficient confidence values are input to the head pose network 240. In this manner, a head pose network 240 may consider only non-occluded regions of the subject's head when determining head pose, thus generating more accurate results. This may produce more accurate results as compared to conventional head pose determination models, which do not possess the ability to discriminate between occluded and non-occluded regions of a subject's head when determining its pose.

An exemplary drowsiness model 250 as shown in FIG. 2 may be any one or more machine learning models that determine a drowsiness status from at least landmark points of the subject's face. As one example, the drowsiness model 250 may be one or more machine learning models constructed to receive both landmark values and corresponding confidence values as inputs, and to output a drowsiness state, e.g., a binary drowsy/non-drowsy state, one of a finite number of drowsiness states, or the like. Such networks may include known drowsiness detection networks configured to receive landmark values as input, where these networks are modified to take in confidence values as an additional input. Confidence values may then be used, for instance, to alter weights of features determined from input landmarks or weights of the input landmarks themselves (with weight values of input landmarks being generally inversely proportional to the level of occlusion associated with the landmarks, i.e., proportional to their corresponding confidence values) to reduce the contribution of features corresponding to landmark points having low confidence value, and/or to increase the contribution of features corresponding to landmark points having higher confidence values. As another example, the drowsiness detection network 250 may be one or more machine learning models constructed to receive landmark values as input but not confidence values. In this latter example, the confidence values may be used to filter out landmark points of insufficient confidence, prior to input to the drowsiness detection network 250. That is, the confidence values may be used as a filter prior to drowsiness model input, so that only those landmark points having sufficient confidence values are input to the drowsiness detection network 250. In this manner, a drowsiness detection network 250 may consider only non-occluded regions of the subject's head when determining drowsiness state, thus generating more accurate and efficient results given the available data. This may produce more accurate results as compared to conventional drowsiness detection models, which do not possess the ability to discriminate between occluded and non-occluded regions of a subject's head when determining drowsiness.

The outputs of the gaze network 230, head pose network 240, and drowsiness model 250 may be transmitted to any system or module for any use. For example, the outputs of these networks may be transmitted to a visualizer 260, which may be any display suitable for displaying electronic information. The visualizer 260 may display the outputs of the gaze network 230, head pose network 240, and drowsiness model 250 in graphical or visual form, and/or may display alerts, warning messages, or any other indicators based on these outputs, so that users may see the indicators and react accordingly.

It is noted that the system of FIG. 2 may include other networks besides the gaze network 230, head pose network 240, and drowsiness model 250. In particular, landmark points and confidence values output by facial landmarks network 220 may be input to any number of other networks. For example, in addition to the gaze network 230, head pose network 240, and drowsiness model 250, the system of FIG. 2 may further include any other network, such as a cognitive load network. An exemplary cognitive load network may be any one or more machine learning models that determine a cognitive load state, or an estimate of the amount of a subject's working memory currently being used, from at least landmark points of the subject's face. As one example, the cognitive load network may include one or more machine learning models constructed to receive both landmark values and corresponding confidence values as inputs, and to output a cognitive load state, e.g., a binary excessive/non-excessive cognitive load state, one of a finite number of cognitive load states, or the like. Such networks may include known cognitive load detection networks configured to receive landmark values as input, where these networks are modified to take in confidence values as an additional input. Confidence values may then be used, for instance, to alter weights of features determined from input landmarks or weights of the input landmarks themselves (with weight values of input landmarks being generally inversely proportional to the level of occlusion associated with the landmarks, i.e., proportional to their corresponding confidence values) to reduce the contribution of features corresponding to landmark points having low confidence value, and/or to increase the contribution of features corresponding to landmark points having higher confidence values. As another example, the cognitive load detection network may be one or more machine learning models constructed to receive landmark values as input but not confidence values. In this latter example, the confidence values may be used to filter out landmark points of insufficient confidence, prior to input to the cognitive load detection network. That is, the confidence values may be used as a filter prior to cognitive load model input, so that only those landmark points having sufficient confidence values are input to the cognitive load detection network. In this manner, a cognitive load detection network may consider only non-occluded regions of the subject's head when determining cognitive load state, thus generating more accurate results. This may produce more accurate results as compared to conventional cognitive load detection models, which do not possess the ability to discriminate between occluded and non-occluded regions of a subject's head when determining cognitive load state.

The system of FIG. 2 may also include a distraction state network. An exemplary distraction state network may be any one or more machine learning models that determine a distraction state, or an estimate of the distraction level of a subject such as a vehicle driver. As one example, the distraction state network may include one or more machine learning models constructed to receive both landmark values and corresponding confidence values as inputs, and to output a distraction state, e.g., a binary distracted/not-distracted state, one of a finite number of distraction states, or the like, based on characteristics such as the gaze direction of the subject. Such networks may include known distraction state networks configured to receive landmark values as input, where these networks are modified to take in confidence values as an additional input. Confidence values may then be used, for instance, to alter weights of features determined from input landmarks or weights of the input landmarks themselves (with weight values of input landmarks being generally inversely proportional to the level of occlusion associated with the landmarks, i.e., proportional to their corresponding confidence values) to reduce the contribution of features corresponding to landmark points having low confidence value, and/or to increase the contribution of features corresponding to landmark points having higher confidence values. As another example, the distraction state network may be one or more machine learning models constructed to receive landmark values as input but not confidence values. In this latter example, the confidence values may be used to filter out landmark points of insufficient confidence, prior to input to the distraction state network. That is, the confidence values may be used as a filter prior to distraction state network input, so that only those landmark points having sufficient confidence values are input to the distraction state network. In this manner, a distraction state network may consider only non-occluded regions of the subject's head when determining distraction state, thus generating more accurate results. This may produce more accurate results as compared to conventional distraction state models, which do not possess the ability to discriminate between occluded and non-occluded regions of a subject's head when determining distraction state.

Figure 3:
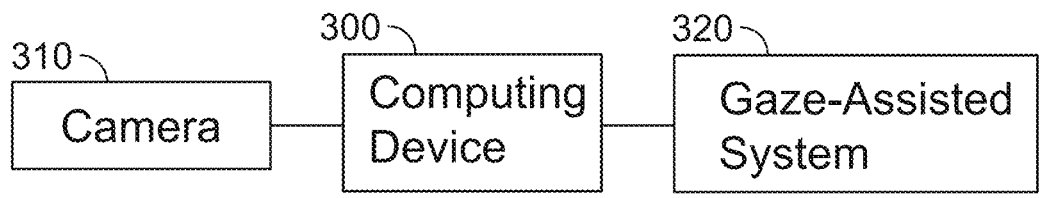
FIG. 3 is a block diagram representation of one exemplary gaze determination system of embodiments of the disclosure.

FIG. 3 is a block diagram representation of one exemplary gaze determination system of embodiments of the disclosure. Here, computing device 300, which may be any electronic computing device containing processing circuitry capable of carrying out the landmark and confidence value determination operations of embodiments of the disclosure, is in electronic communication with both a camera 310 and a gaze-assisted system 320. In operation, camera 310, which may correspond to camera 200 of FIG. 2 as well as cabin camera 441 of FIGS. 4A and 4C below, captures and transmits images of a subject to computing device 300, which then implements the machine learning models of, e.g., FIG. 2, determining from the image of camera 310 the output landmark and confidence values for the subject's face. The computing device 300 transmits landmark and confidence values to gaze-assisted system 320, which takes an action or performs one or more operations in response. Computing device 300 may be any one or more electronic computing devices suitable for implementing the machine learning models of embodiments of the disclosure, such as computing device(s) 500 described below in further detail.

Gaze-assisted system 320 may be any system capable of performing one or more actions based on the landmark and confidence values it receives from computing device 300, such as determining gaze directions of subjects and taking various actions in response. The gaze-assisted system 320 may include for example the gaze network 230, head pose network 240, drowsiness model 250, and visualizer 260 of FIG. 2. Any configurations of camera 310, computing device 300, and gaze-assisted system 320 are contemplated. As one example, the gaze-assisted system 320 may be an autonomous vehicle capable of determining and reacting to the gaze direction of the driver or another passenger, such as the autonomous vehicle 400 described in further detail below. In this example, camera 310 and computing device 300 may be positioned within the vehicle, while the gaze-assisted system 320 may represent the vehicle itself. Camera 310 may be positioned at any location within the vehicle that allows it a view of the driver or passenger. Accordingly, camera 310 may capture images of the driver or passenger and transmit them to computing device 300, which calculates corresponding landmark and confidence values of the subject. The vehicle may include a gaze network such as that shown in FIG. 2, to determine resulting subject gaze direction. This gaze direction may then be transmitted to, for example, another software module that determines actions the vehicle may take in response. For instance, the vehicle may determine that the gaze direction represents a distracted driver, or a driver that is not paying attention to the road, and may initiate any type of operation in response. Such operations may include any type of warning issued to the driver (e.g., a visual or audible warning, a warning on a heads-up display, or the like), auto-pilot initiation, a braking or turning operation, or any other action. Computing device 300 may be positioned within the vehicle of gaze-assisted system 320 as a local processor, or may be a remote processor that receives images from camera 310 and transmits gaze directions or instructions wirelessly to the vehicle of gaze-assisted system 320.

As another example, gaze-assisted system 320 may be a virtual reality or augmented reality system capable of displaying images responsive to motion and gaze of users. In this example, gaze-assisted system 320 includes a virtual reality or augmented reality display, such as a headset worn by a user and configured to project images thereto. Camera 310 and computing device 300 may be positioned within the headset, with camera 310 capturing images of the eyes of the user and computing device 300 determining landmark and confidence values, as well as his or her gaze direction therefrom. This gaze direction may then be transmitted to the virtual reality or augmented reality display, which may perform any action in response. For instance, to conserve computational resources, gaze-assisted system 320 may render only those virtual reality or augmented reality elements which are within the user's field of view as determined using the determined gaze direction. Similarly, gaze-assisted system 320 may alert the user to objects or events that are determined to be outside the user's field of view but which the user may wish to avoid, or may be interested in. As with the autonomous vehicle example above, computing device 300 of a virtual reality or augmented reality system may be located within system 320, e.g., within the headset itself, or may be located remotely so that images are transmitted wirelessly to computing device 300 and calculated gaze directions may be transmitted wirelessly back to the headset, which in turn may perform various operations in response. In this manner, systems and methods of embodiments of the disclosure may yield virtual reality or augmented reality systems that determine user gaze direction more accurately and efficiently. In particular, use of higher-confidence landmark points increases the accuracy of gaze determination, and reduces wasted computational resources associated with rendering images for incorrectly-determined gaze directions.

As yet another example, gaze-assisted system 320 may be a computer-based advertising system that determines which ads a user is looking at. More specifically, gaze-assisted system 320 may be any electronic computing system or device, such as a desktop computer, a laptop computer, a smartphone, a server computer, or the like. Camera 310 and computing device 300 may be incorporated into this computing device to point toward the user, such as into or proximate to the display of the computing device. Camera 310 may capture images of the user and computing device 300 may determine landmark and confidence values, as well as his or her gaze direction therefrom. Determined gaze directions can then be transmitted to gaze-assisted system 320, e.g., computing device 300 displaying advertisements for the user, a remote computing device, or the like. The computing device may then use the calculated gaze direction to determine which ad the user is focusing on, providing information on the effectiveness of various ads.

Figure 4A:
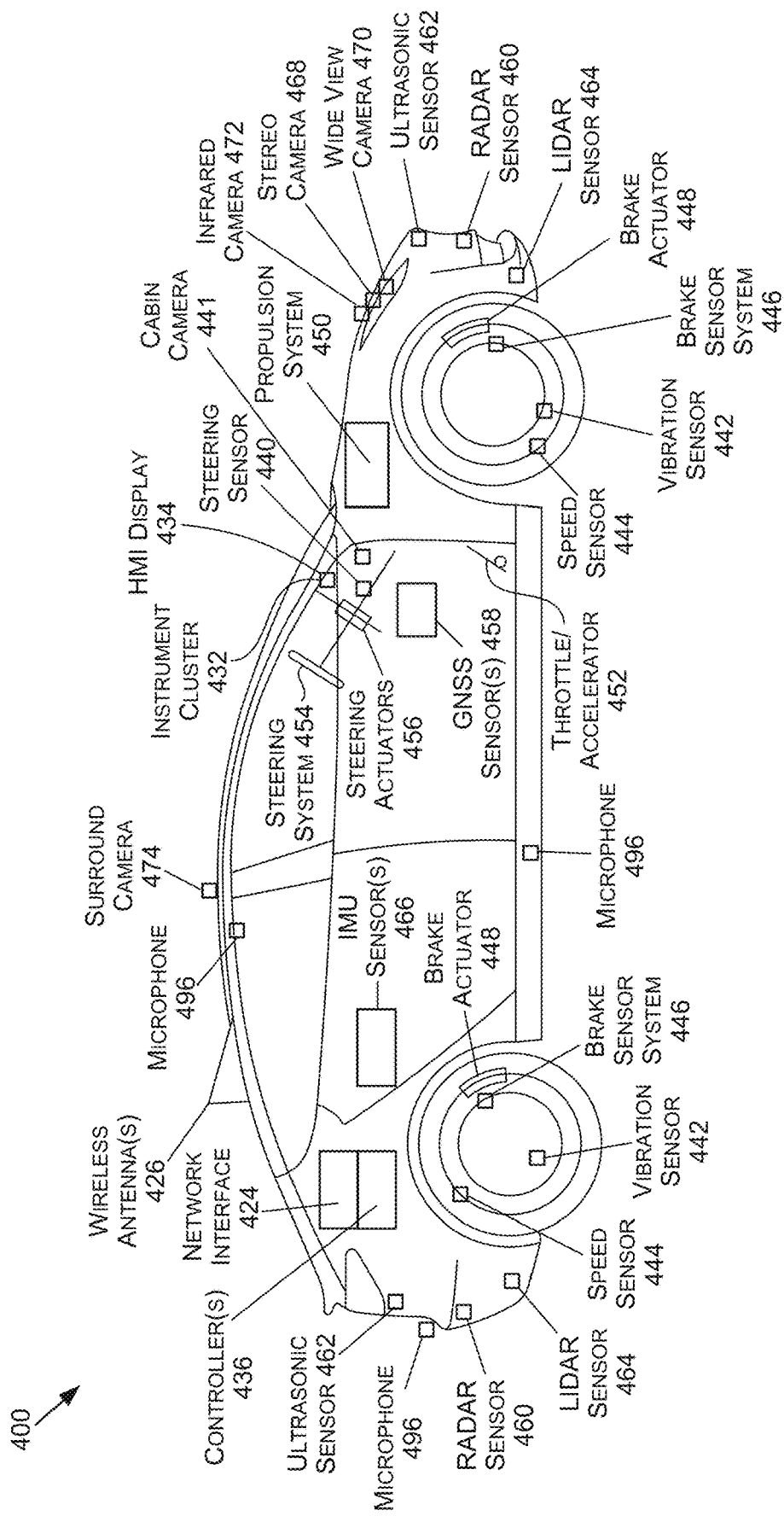
FIG. 4A is an illustration of an example autonomous vehicle, in accordance with some embodiments of the present disclosure.

FIG. 4A is an illustration of an example autonomous vehicle 400, in accordance with some embodiments of the present disclosure. The autonomous vehicle 400 (alternatively referred to herein as the "vehicle 400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 400 may be capable of functionality in accordance with one or more of Level 3-Level 5 of the autonomous driving levels. For example, the vehicle 400 may be capable of conditional automation (Level 3), high automation (Level 4), and/or full automation (Level 5), depending on the embodiment.

The vehicle 400 may include components such as a chassis, a vehicle body, wheels (e.g., 2, 4, 6, 8, 18, etc.), tires, axles, and other components of a vehicle. The vehicle 400 may include a propulsion system 450, such as an internal combustion engine, hybrid electric power plant, an all-electric engine, and/or another propulsion system type. The propulsion system 450 may be connected to a drive train of the vehicle 400, which may include a transmission, to enable the propulsion of the vehicle 400. The propulsion system 450 may be controlled in response to receiving signals from the throttle/accelerator 452.

A steering system 454, which may include a steering wheel, may be used to steer the vehicle 400 (e.g., along a desired path or route) when the propulsion system 450 is operating (e.g., when the vehicle is in motion). The steering system 454 may receive signals from a steering actuator 456. The steering wheel may be optional for full automation (Level 5) functionality.

The brake sensor system 446 may be used to operate the vehicle brakes in response to receiving signals from the brake actuators 448 and/or brake sensors.

Controller(s) 436, which may include one or more CPU(s), system on chips (SoCs) 404 (FIG. 4C) and/or GPU(s), may provide signals (e.g., representative of commands) to one or more components and/or systems of the vehicle 400. For example, the controller(s) may send signals to operate the vehicle brakes via one or more brake actuators 448, to operate the steering system 454 via one or more steering actuators 456, and/or to operate the propulsion system 450 via one or more throttle/accelerators 452. The controller(s) 436 may include one or more onboard (e.g., integrated) computing devices (e.g., supercomputers) that process sensor signals, and output operation commands (e.g., signals representing commands) to enable autonomous driving and/or to assist a human driver in driving the vehicle 400. The controller(s) 436 may include a first controller 436 for autonomous driving functions, a second controller 436 for functional safety functions, a third controller 436 for artificial intelligence functionality (e.g., computer vision), a fourth controller 436 for infotainment functionality, a fifth controller 436 for redundancy in emergency conditions, and/or other controllers. In some examples, a single controller 436 may handle two or more of the above functionalities, two or more controllers 436 may handle a single functionality, and/or any combination thereof.

The controller(s) 436 may provide the signals for controlling one or more components and/or systems of the vehicle 400 in response to sensor data received from one or more sensors (e.g., sensor inputs). The sensor data may be received from, for example and without limitation, global navigation satellite systems sensor(s) 458 (e.g., Global Positioning System sensor(s)), RADAR sensor(s) 460, ultrasonic sensor(s) 462, LIDAR sensor(s) 464, inertial measurement unit (IMU) sensor(s) 466 (e.g., accelerometer(s), gyroscope(s), magnetic compass(es), magnetometer(s), etc.), microphone(s) 496, stereo camera(s) 468, wide-view camera(s) 470 (e.g., fisheye cameras), infrared camera(s) 472, surround camera(s) 474 (e.g., 360 degree cameras), long-range and/or mid-range camera(s) 498, speed sensor(s)

444 (e.g., for measuring the speed of the vehicle 400), vibration sensor(s) 442, steering sensor(s) 440, brake sensor(s) 446 (e.g., as part of the brake sensor system 446), and/or other sensor types.

One or more of the controller(s) 436 may receive inputs (e.g., represented by input data) from an instrument cluster 432 of the vehicle 400 and provide outputs (e.g., represented by output data, display data, etc.) via a human-machine interface (HMI) display 434, an audible annunciator, a loudspeaker, and/or via other components of the vehicle 400. The outputs may include information such as vehicle velocity, speed, time, map data (e.g., the HD map 422 of FIG. 4C), location data (e.g., the location of the vehicle 400, such as on a map), direction, location of other vehicles (e.g., an occupancy grid), information about objects and status of objects as perceived by the controller(s) 436, etc. For example, the HMI display 434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 400 further includes a network interface 424, which may use one or more wireless antenna(s) 426 and/or modem(s) to communicate over one or more networks. For example, the network interface 424 may be capable of communication over LTE, WCDMA, UMTS, GSM, CDMA2000, etc. The wireless antenna(s) 426 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 4B:
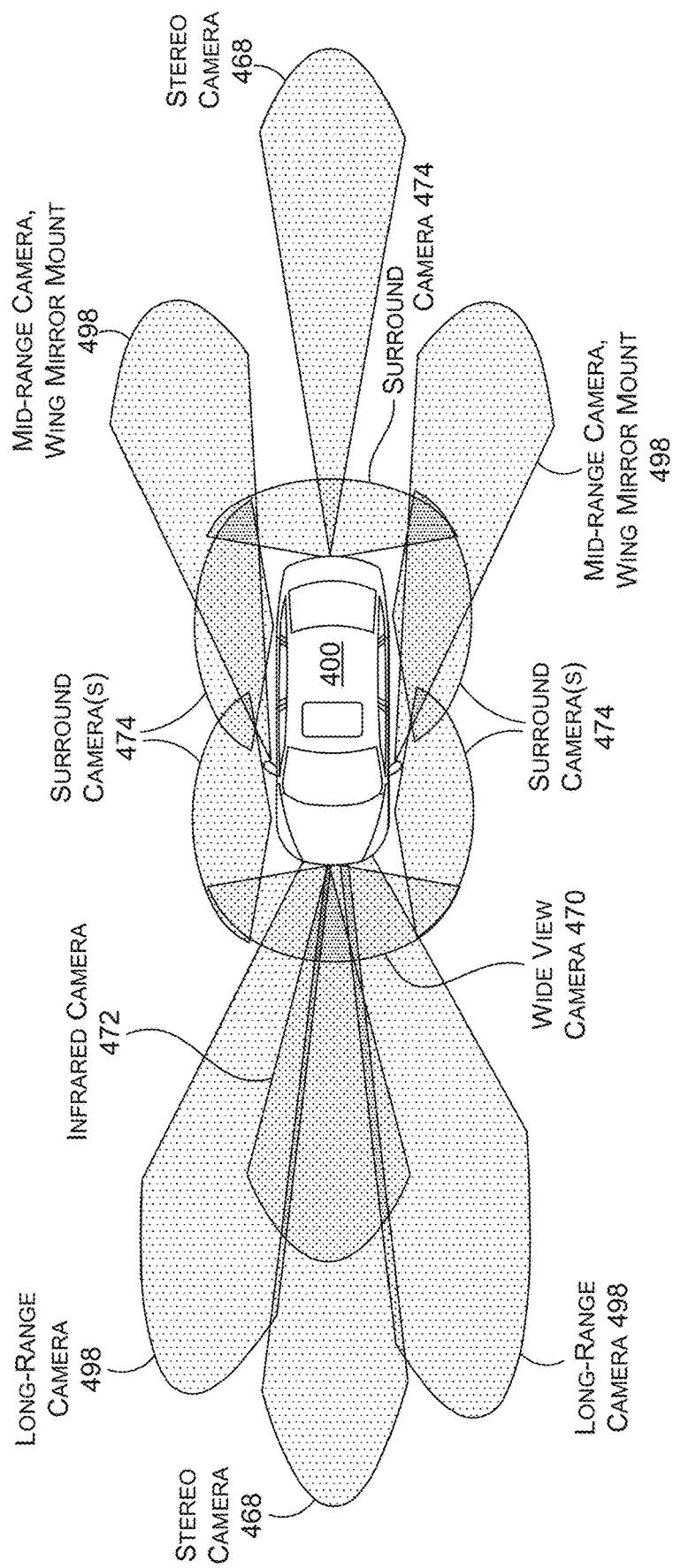
FIG. 4B is an example of camera locations and fields of view for the example autonomous vehicle of FIG. 4A, in accordance with some embodiments of the present disclosure.

FIG. 4B is an example of camera locations and fields of view for the example autonomous vehicle 400 of FIG. 4A, in accordance with some embodiments of the present disclosure. The cameras and respective fields of view are one example embodiment and are not intended to be limiting. For example, additional and/or alternative cameras may be included and/or the cameras may be located at different locations on the vehicle 400.

The camera types for the cameras may include, but are not limited to, digital cameras that may be adapted for use with the components and/or systems of the vehicle 400. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 400 (e.g., front-facing cameras) may be used for surround view, to help identify forward-facing paths and obstacles, as well aid in, with the help of one or more controllers 436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 470 that may be used to perceive objects coming into view from the periphery (e.g., pedestrians, crossing traffic or bicycles). Although only one wide-view camera is illustrated in FIG. 4B, there may any number of wide-view cameras 470 on the vehicle 400. In addition, long-range camera(s) 498 (e.g., a long-view stereo camera pair) may be used for depth-based object detection, especially for objects for which a neural network has not yet been trained. The long-range camera(s) 498 may also be used for object detection and classification, as well as basic object tracking.

One or more stereo cameras 468 may also be included in a front-facing configuration. The stereo camera(s) 468 may include an integrated control unit comprising a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 468 may be used in addition to, or alternatively from, those described herein.

Cameras with a field of view that includes portions of the environment to the side of the vehicle 400 (e.g., side-view cameras) may be used for surround view, providing information used to create and update the occupancy grid, as well as to generate side impact collision warnings. For example, surround camera(s) 474 (e.g., four surround cameras 474 as illustrated in FIG. 4B) may be positioned around the vehicle 400. The surround camera(s) 474 may include wide-view camera(s) 470, fisheye camera(s), 360-degree camera(s), and/or the like. For example, four fisheye cameras may be positioned on the vehicle's front, rear, and sides. In an alternative arrangement, the vehicle may use three surround camera(s) 474 (e.g., left, right, and rear), and may leverage one or more other camera(s) (e.g., a forward-facing camera) as a fourth surround-view camera.

Cameras with a field of view that include portions of the environment to the rear of the vehicle 400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 498, stereo camera(s) 468), infrared camera(s) 472, etc.), as described herein.

Cameras with a field of view that include portions of the interior or cabin of vehicle 400 may be used to monitor one or more states of drivers, passengers, or objects in the cabin. Any type of camera may be used including, but not limited to, cabin camera(s) 441, which may be any type of camera described herein, and which may be placed anywhere on or in vehicle 400 that provides a view of the cabin or interior thereof. For example, cabin camera(s) 441 may be placed within or on some portion of the vehicle 400 dashboard, rear view mirror, side view mirrors, seats, or doors and oriented to capture images of any drivers, passengers, or any other object or portion of the vehicle 400.

Figure 4C:
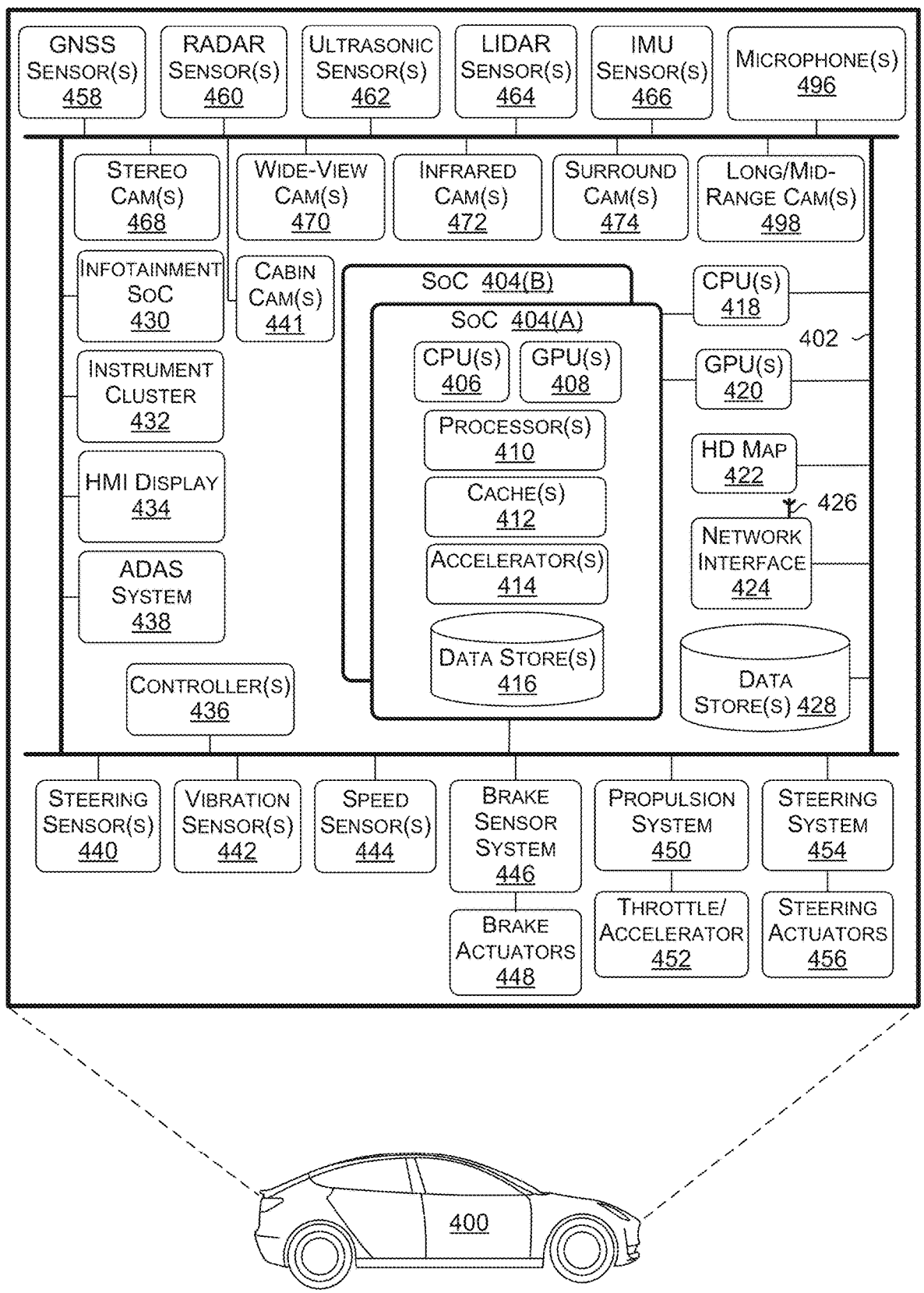
FIG. 4C is a block diagram of an example system architecture for the example autonomous vehicle of FIG. 4A, in accordance with some embodiments of the present disclosure.

FIG. 4C is a block diagram of an example system architecture for the example autonomous vehicle 400 of FIG. 4A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 400 in FIG. 4C is illustrated as being connected via bus 402. The bus 402 may include a Controller Area Network (CAN) data interface (alternatively referred to herein as a "CAN bus"). A CAN may be a network inside the vehicle 400 used to aid in control of various features and functionality of the vehicle 400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 402 is described herein as being a CAN bus, this is not intended to be limiting. For example, in addition to, or alternatively from, the CAN bus, FlexRay and/or Ethernet may be used. Additionally, although a single line is used to represent the bus 402, this is not intended to be limiting. For example, there may be any number of busses 402, which may include one or more CAN busses, one or more FlexRay busses, one or more Ethernet busses, and/or one or more other types of busses using a different protocol. In some examples, two or more busses 402 may be used to perform different functions, and/or may be used for redundancy. For example, a first bus 402 may be used for collision avoidance functionality and a second bus 402 may be used for actuation control. In any example, each bus 402 may communicate with any of the components of the vehicle 400, and two or more busses 402 may communicate with the same components. In some examples, each SoC 404, each controller 436, and/or each computer within the vehicle may have access to the same input data (e.g., inputs from sensors of the vehicle 400), and may be connected to a common bus, such the CAN bus.

The vehicle 400 may include one or more controller(s) 436, such as those described herein with respect to FIG. 4A. The controller(s) 436 may be used for a variety of functions. The controller(s) 436 may be coupled to any of the various other components and systems of the vehicle 400 and may be used for control of the vehicle 400, artificial intelligence of the vehicle 400, infotainment for the vehicle 400, and/or the like.

The vehicle 400 may include a system(s) on a chip (SoC) 404. The SoC 404 may include CPU(s) 406, GPU(s) 408, processor(s) 410, cache(s) 412, accelerator(s) 414, data store(s) 416, and/or other components and features not illustrated. The SoC(s) 404 may be used to control the vehicle 400 in a variety of platforms and systems. For example, the SoC(s) 404 may be combined in a system (e.g., the system of the vehicle 400) with an HD map 422 which may obtain map refreshes and/or updates via a network interface 424 from one or more servers (e.g., server(s) 478 of FIG. 4D).

The CPU(s) 406 may include a CPU cluster or CPU complex (alternatively referred to herein as a "CCPLEX"). The CPU(s) 406 may include multiple cores and/or L2 caches. For example, in some embodiments, the CPU(s) 406 may include eight cores in a coherent multi-processor configuration. In some embodiments, the CPU(s) 406 may include four dual-core clusters where each cluster has a dedicated L2 cache (e.g., a 2 MB L2 cache). The CPU(s) 406 (e.g., the CCPLEX) may be configured to support simultaneous cluster operation enabling any combination of the clusters of the CPU(s) 406 to be active at any given time.

The CPU(s) 406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 408 may include an integrated GPU (alternatively referred to herein as an "iGPU"). The GPU(s) 408 may be programmable and may be efficient for parallel workloads. The GPU(s) 408, in some examples, may use an enhanced tensor instruction set. The GPU(s) 408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 408 may include at least eight streaming microprocessors. The GPU(s) 408 may use computer-based application programming interface(s) (API(s)). In addition, the GPU(s) 408 may use one or more parallel computing platforms and/or programming models (e.g., NVIDIA's CUDA).

The GPU(s) 408 may be power-optimized for best performance in automotive and embedded use cases. For example, the GPU(s) 408 may be fabricated on a Fin field-effect transistor (FinFET). However, this is not intended to be limiting, and the GPU(s) 408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDRS).

The GPU(s) 408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 408 to access the CPU(s) 406 page tables directly. In such examples, when the GPU(s) 408 memory management unit (MMU) experiences a miss, an address translation request may be transmitted to the CPU(s) 406. In response, the CPU(s) 406 may look in its page tables for the virtual-to-physical mapping for the address and transmits the translation back to the GPU(s) 408. As such, unified memory technology may allow a single unified virtual address space for memory of both the CPU(s) 406 and the GPU(s) 408, thereby simplifying the GPU(s) 408 programming and porting of applications to the GPU(s) 408.

In addition, the GPU(s) 408 may include an access counter that may keep track of the frequency of access of the GPU(s) 408 to memory of other processors. The access counter may help ensure that memory pages are moved to the physical memory of the processor that is accessing the pages most frequently.

The SoC(s) 404 may include any number of cache(s) 412, including those described herein. For example, the cache(s) 412 may include an L3 cache that is available to both the CPU(s) 406 and the GPU(s) 408 (e.g., that is connected to both the CPU(s) 406 and the GPU(s) 408). The cache(s) 412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 404 may include an arithmetic logic unit(s) (ALU(s)) which may be leveraged in performing processing with respect to any of the variety of tasks or operations of the vehicle 400—such as processing DNNs. In addition, the SoC(s) 404 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 406 and/or GPU(s) 408.

The SoC(s) 404 may include one or more accelerators 414 (e.g., hardware accelerators, software accelerators, or a combination thereof). For example, the SoC(s) 404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 408 and to off-load some of the tasks of the GPU(s) 408 (e.g., to free up more cycles of the GPU(s) 408 for performing other tasks). As an example, the accelerator(s) 414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 408, and by using an inference accelerator, for example, a designer may target either the DLA(s) or the GPU(s) 408 for any function. For example, the designer may focus processing of CNNs and floating point operations on the DLA(s) and leave other functions to the GPU(s) 408 and/or other accelerator(s) 414.

The accelerator(s) 414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 414 (e.g., the hardware acceleration cluster) may include a computer vision network on-chip and SRAM, for providing a high-bandwidth, low latency SRAM for the accelerator(s) 414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.).

The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 466 output that correlates with the vehicle 400 orientation, distance, 3D location estimates of the object obtained from the neural network and/or other sensors (e.g., LIDAR sensor(s) 464 or RADAR sensor(s) 460), among others.

The SoC(s) 404 may include data store(s) 416 (e.g., memory). The data store(s) 416 may be on-chip memory of the SoC(s) 404, which may store neural networks to be executed on the GPU and/or the DLA. In some examples, the data store(s) 416 may be large enough in capacity to store multiple instances of neural networks for redundancy and safety. The data store(s) 416 may comprise L2 or L3 cache(s) 412. Reference to the data store(s) 416 may include reference to the memory associated with the PVA, DLA, and/or other accelerator(s) 414, as described herein.

The SoC(s) 404 may include one or more processor(s) 410 (e.g., embedded processors). The processor(s) 410 may include a boot and power management processor that may be a dedicated processor and subsystem to handle boot power and management functions and related security enforcement. The boot and power management processor may be a part of the SoC(s) 404 boot sequence and may provide runtime power management services. The boot power and management processor may provide clock and voltage programming, assistance in system low power state transitions, management of SoC(s) 404 thermals and temperature sensors, and/or management of the SoC(s) 404 power states. Each temperature sensor may be implemented as a ring-oscillator whose output frequency is proportional to temperature, and the SoC(s) 404 may use the ring-oscillators to detect temperatures of the CPU(s) 406, GPU(s) 408, and/or accelerator(s) 414. If temperatures are determined to exceed a threshold, the boot and power management processor may enter a temperature fault routine and put the SoC(s) 404 into a lower power state and/or put the vehicle 400 into a chauffeur to safe-stop mode (e.g., bring the vehicle 400 to a safe stop).

The processor(s) 410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 410 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 410 may further include a real-time camera engine that may include a dedicated processor subsystem for handling real-time camera management.

The processor(s) 410 may further include a high dynamic range signal processor that may include an image signal processor that is a hardware engine that is part of the camera processing pipeline.

The processor(s) 410 may include a video image compositor that may be a processing block (e.g., implemented on a microprocessor) that implements video post-processing functions needed by a video playback application to produce the final image for the player window. The video image compositor may perform lens distortion correction on wide-view camera(s) 470, surround camera(s) 474, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 408 is not required to continuously render new surfaces. Even when the GPU(s) 408 is powered on and actively performing 3D rendering, the video image compositor may be used to offload the GPU(s) 408 to improve performance and responsiveness.

The SoC(s) 404 may further include a mobile industry processor interface (MIPI) camera serial interface for receiving video and input from cameras, a high-speed interface, and/or a video input block that may be used for camera and related pixel input functions. The SoC(s) 404 may further include an input/output controller(s) that may be controlled by software and may be used for receiving I/O signals that are uncommitted to a specific role. The SoC(s) 404 may further include a broad range of peripheral interfaces to enable communication with peripherals, audio codecs, power management, and/or other devices. The SoC(s) 404 may be used to process data from cameras (e.g., connected over Gigabit Multimedia Serial Link and Ethernet), sensors (e.g., LIDAR sensor(s) 464, RADAR sensor(s) 460, etc. that may be connected over Ethernet), data from bus 402 (e.g., speed of vehicle 400, steering wheel position, etc.), data from GNSS sensor(s) 458 (e.g., connected over Ethernet or CAN bus). The SoC(s) 404 may further include dedicated high-performance mass storage controllers that may include their own DMA engines, and that may be used to free the CPU(s) 406 from routine data management tasks.

The SoC(s) 404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 404 may be faster, more reliable, and even more energy-efficient and space-efficient than conventional systems. For example, the accelerator(s) 414, when combined with the CPU(s) 406, the GPU(s) 408, and the data store(s) 416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 420) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 408.

In some examples, a CNN for facial recognition and vehicle owner identification may use data from camera sensors to identify the presence of an authorized driver and/or owner of the vehicle 400. The always-on sensor processing engine may be used to unlock the vehicle when the owner approaches the driver door and turn on the lights, and, in security mode, to disable the vehicle when the owner leaves the vehicle. In this way, the SoC(s) 404 provide for security against theft and/or carjacking.

In another example, a CNN for emergency vehicle detection and identification may use data from microphones 496 to detect and identify emergency vehicle sirens. In contrast to conventional systems, which use general classifiers to detect sirens and manually extract features, the SoC(s) 404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 462, until the emergency vehicle(s) passes.

The vehicle may include a CPU(s) 418 (e.g., discrete CPU(s), or dCPU(s)), that may be coupled to the SoC(s) 404 via a high-speed interconnect (e.g., PCIe). The CPU(s) 418 may include an X86 processor, for example. The CPU(s) 418 may be used to perform any of a variety of functions, including arbitrating potentially inconsistent results between ADAS sensors and the SoC(s) 404, and/or monitoring the status and health of the controller(s) 436 and/or infotainment SoC 430, for example.

The vehicle 400 may include a GPU(s) 420 (e.g., discrete GPU(s), or dGPU(s)), that may be coupled to the SoC(s) 404 via a high-speed interconnect (e.g., NVIDIA's NVLINK). The GPU(s) 420 may provide additional artificial intelligence functionality, such as by executing redundant and/or different neural networks, and may be used to train and/or update neural networks based on input (e.g., sensor data) from sensors of the vehicle 400.

The vehicle 400 may further include the network interface 424 which may include one or more wireless antennas 426 (e.g., one or more wireless antennas for different communication protocols, such as a cellular antenna, a Bluetooth antenna, etc.). The network interface 424 may be used to enable wireless connectivity over the Internet with the cloud (e.g., with the server(s) 478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 400 information about vehicles in proximity to the vehicle 400 (e.g., vehicles in front of, on the side of, and/or behind the vehicle 400). This functionality may be part of a cooperative adaptive cruise control functionality of the vehicle 400.

The network interface 424 may include an SoC that provides modulation and demodulation functionality and enables the controller(s) 436 to communicate over wireless networks. The network interface 424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols. The vehicle 400 may further include data store(s) 428, which may include off-chip (e.g., off the SoC(s) 404) storage. The data store(s) 428 may include one or more storage elements including RAM, SRAM, DRAM, VRAM, Flash, hard disks, and/or other components and/or devices that may store at least one bit of data.

The vehicle 400 may further include GNSS sensor(s) 458 (e.g., GPS and/or assisted GPS sensors), to assist in mapping, perception, occupancy grid generation, and/or path planning functions. Any number of GNSS sensor(s) 458 may be used, including, for example and without limitation, a GPS using a USB connector with an Ethernet to serial (RS-232) bridge. The vehicle 400 may further include RADAR sensor(s) 460. The RADAR sensor(s) 460 may be used by the vehicle 400 for long-range vehicle detection, even in darkness and/or severe weather conditions. RADAR functional safety levels may be ASIL B. The RADAR sensor(s) 460 may use the CAN and/or the bus 402 (e.g., to transmit data generated by the RADAR sensor(s) 460) for control and to access object tracking data, with access to Ethernet to access raw data, in some examples. A wide variety of RADAR sensor types may be used. For example, and without limitation, the RADAR sensor(s) 460 may be suitable for front, rear, and side RADAR use. In some example, Pulse Doppler RADAR sensor(s) are used.

The RADAR sensor(s) 460 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 400 at higher speeds with minimal interference from traffic in adjacent lanes. The other two antennae may expand the field of view, making it possible to quickly detect vehicles entering or leaving the vehicle's 400 lane.

Mid-range RADAR systems may include, as an example, a range of up to 460 m (front) or 80 m (rear), and a field of view of up to 42 degrees (front) or 450 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 400 may further include ultrasonic sensor(s) 462. The ultrasonic sensor(s) 462, which may be positioned at the front, back, and/or the sides of the vehicle 400, may be used for park assist and/or to create and update an occupancy grid. A wide variety of ultrasonic sensor(s) 462 may be used, and different ultrasonic sensor(s) 462 may be used for different ranges of detection (e.g., 2.5 m, 4 m). The ultrasonic sensor(s) 462 may operate at functional safety levels of ASIL B.

The vehicle 400 may include LIDAR sensor(s) 464. The LIDAR sensor(s) 464 may be used for object and pedestrian detection, emergency braking, collision avoidance, and/or other functions. The LIDAR sensor(s) 464 may be functional safety level ASIL B. In some examples, the vehicle 400 may include multiple LIDAR sensors 464 (e.g., two, four, six, etc.) that may use Ethernet (e.g., to provide data to a Gigabit Ethernet switch).

In some examples, the LIDAR sensor(s) 464 may be capable of providing a list of objects and their distances for a 360-degree field of view. Commercially available LIDAR sensor(s) 464 may have an advertised range of approximately 100 m, with an accuracy of 2 cm-3 cm, and with support for a 100 Mbps Ethernet connection, for example. In some examples, one or more non-protruding LIDAR sensors 464 may be used. In such examples, the LIDAR sensor(s) 464 may be implemented as a small device that may be embedded into the front, rear, sides, and/or corners of the vehicle 400. The LIDAR sensor(s) 464, in such examples, may provide up to a 120-degree horizontal and 35-degree vertical field-of-view, with a 200 m range even for low-reflectivity objects. Front-mounted LIDAR sensor(s) 464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 400. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 464 may be less susceptible to motion blur, vibration, and/or shock.

The vehicle may further include IMU sensor(s) 466. The IMU sensor(s) 466 may be located at a center of the rear axle of the vehicle 400, in some examples. The IMU sensor(s) 466 may include, for example and without limitation, an accelerometer(s), a magnetometer(s), a gyroscope(s), a magnetic compass(es), and/or other sensor types. In some examples, such as in six-axis applications, the IMU sensor(s) 466 may include accelerometers and gyroscopes, while in nine-axis applications, the IMU sensor(s) 466 may include accelerometers, gyroscopes, and magnetometers.

In some embodiments, the IMU sensor(s) 466 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 466 may enable the vehicle 400 to estimate heading without requiring input from a magnetic sensor by directly observing and correlating the changes in velocity from GPS to the IMU sensor(s) 466. In some examples, the IMU sensor(s) 466 and the GNSS sensor(s) 458 may be combined in a single integrated unit.

The vehicle may include microphone(s) 496 placed in and/or around the vehicle 400. The microphone(s) 496 may be used for emergency vehicle detection and identification, among other things.

The vehicle may further include any number of camera types, including stereo camera(s) 468, wide-view camera(s) 470, infrared camera(s) 472, surround camera(s) 474, long-range and/or mid-range camera(s) 498, and/or other camera types. The cameras may be used to capture image data around an entire periphery of the vehicle 400. The types of cameras used depends on the embodiments and requirements for the vehicle 400, and any combination of camera types may be used to provide the necessary coverage around the vehicle 400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 4A and FIG. 4B.

The vehicle 400 may further include vibration sensor(s) 442. The vibration sensor(s) 442 may measure vibrations of components of the vehicle, such as the axle(s). For example, changes in vibrations may indicate a change in road surfaces. In another example, when two or more vibration sensors 442 are used, the differences between the vibrations may be used to determine friction or slippage of the road surface (e.g., when the difference in vibration is between a power-driven axle and a freely rotating axle).

The vehicle 400 may include an ADAS system 438. The ADAS system 438 may include an SoC, in some examples. The ADAS system 438 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 460, LIDAR sensor(s) 464, and/or a camera(s). The ACC systems may include longitudinal ACC and/or lateral ACC. Longitudinal ACC monitors and controls the distance to the vehicle immediately ahead of the vehicle 400 and automatically adjusts the vehicle speed to maintain a safe distance from vehicles ahead. Lateral ACC performs distance keeping, and advises the vehicle 400 to change lanes when necessary. Lateral ACC is related to other ADAS applications such as LC and CWS.

CACC uses information from other vehicles that may be received via the network interface 424 and/or the wireless antenna(s) 426 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 400), while the I2V communication concept provides information about traffic farther ahead. CACC systems may include either or both I2V and V2V information sources. Given the information of the vehicles ahead of the vehicle 400, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 400 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 400 if the vehicle 400 starts to exit the lane. BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 460, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 400 is backing up. Some RCTW systems include AEB to ensure that the vehicle brakes are applied to avoid a crash. RCTW systems may use one or more rear-facing RADAR sensor(s) 460, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 400, the vehicle 400 itself must, in the case of conflicting results, decide whether to heed the result from a primary computer or a secondary computer (e.g., a first controller 436 or a second controller 436). For example, in some embodiments, the ADAS system 438 may be a backup and/or secondary computer for providing perception information to a backup computer rationality module. The backup computer rationality monitor may run a redundant diverse software on hardware components to detect faults in perception and dynamic driving tasks. Outputs from the ADAS system 438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 404.

In other examples, ADAS system 438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 438 may be fed into the primary computer's perception block and/or the primary computer's dynamic driving task block. For example, if the ADAS system 438 indicates a forward crash warning due to an object immediately ahead, the perception block may use this information when identifying objects. In other examples, the secondary computer may have its own neural network that is trained and thus reduces the risk of false positives, as described herein.

The vehicle 400 may further include the infotainment SoC 430 (e.g., an in-vehicle infotainment system (IVI)). Although illustrated and described as an SoC, the infotainment system may not be a SoC, and may include two or more discrete components. The infotainment SoC 430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 400. For example, the infotainment SoC 430 may include radios, disk players, navigation systems, video players, USB and Bluetooth connectivity, carputers, in-car entertainment, Wi-Fi, steering wheel audio controls, hands-free voice control, a heads-up display (HUD), an HMI display 434, a telematics device, a control panel (e.g., for controlling and/or interacting with various components, features, and/or systems), and/or other components. The infotainment SoC 430 may further be used to provide information (e.g., visual and/or audible) to a user(s) of the vehicle, such as information from the ADAS system 438, autonomous driving information such as planned vehicle maneuvers, trajectories, surrounding environment information (e.g., intersection information, vehicle information, road information, etc.), and/or other information.

The infotainment SoC 430 may include GPU functionality. The infotainment SoC 430 may communicate over the bus 402 (e.g., CAN bus, Ethernet, etc.) with other devices, systems, and/or components of the vehicle 400. In some examples, the infotainment SoC 430 may be coupled to a supervisory MCU such that the GPU of the infotainment system may perform some self-driving functions in the event that the primary controller(s) 436 (e.g., the primary and/or backup computers of the vehicle 400) fail. In such an example, the infotainment SoC 430 may put the vehicle 400 into a chauffeur to safe-stop mode, as described herein.

The vehicle 400 may further include an instrument cluster 432 (e.g., a digital dash, an electronic instrument cluster, a digital instrument panel, etc.). The instrument cluster 432 may include a controller and/or supercomputer (e.g., a discrete controller or supercomputer). The instrument cluster 432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 430 and the instrument cluster 432. In other words, the instrument cluster 432 may be included as part of the infotainment SoC 430, or vice versa.

Figure 4D:
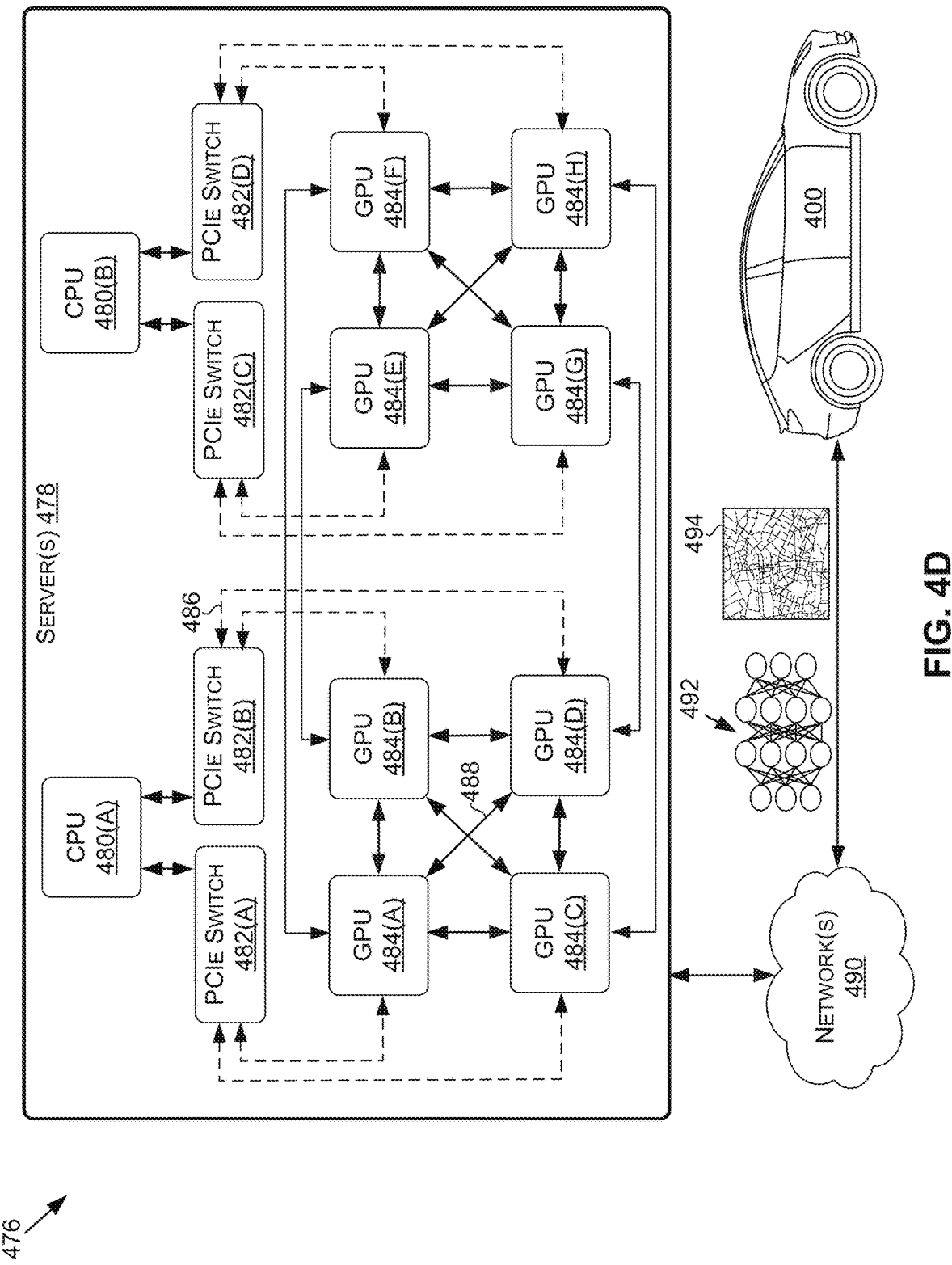
FIG. 4D is a system diagram for communication between cloud-based server(s) and the example autonomous vehicle of FIG. 4A, in accordance with some embodiments of the present disclosure.

FIG. 4D is a system diagram for communication between cloud-based server(s) and the example autonomous vehicle 400 of FIG. 4A, in accordance with some embodiments of the present disclosure. The system 476 may include server(s) 478, network(s) 490, and vehicles, including the vehicle 400. The server(s) 478 may include a plurality of GPUs 484(A)-484(H) (collectively referred to herein as GPUs 484), PCIe switches 482(A)-482(H) (collectively referred to herein as PCIe switches 482), and/or CPUs 480(A)-480(B) (collectively referred to herein as CPUs 480). The GPUs 484, the CPUs 480, and the PCIe switches may be interconnected with high-speed interconnects such as, for example and without limitation, NVLink interfaces 488 developed by NVIDIA and/or PCIe connections 486. In some examples, the GPUs 484 are connected via NVLink and/or NVSwitch SoC and the GPUs 484 and the PCIe switches 482 are connected via PCIe interconnects. Although eight GPUs 484, two CPUs 480, and two PCIe switches are illustrated, this is not intended to be limiting. Depending on the embodiment, each of the server(s) 478 may include any number of GPUs 484, CPUs 480, and/or PCIe switches. For example, the server(s) 478 may each include eight, sixteen, thirty-two, and/or more GPUs 484.

The server(s) 478 may receive, over the network(s) 490 and from the vehicles, image data representative of images showing unexpected or changed road conditions, such as recently commenced roadwork. The server(s) 478 may transmit, over the network(s) 490 and to the vehicles, neural networks 492, updated neural networks 492, and/or map information 494, including information regarding traffic and road conditions. The updates to the map information 494 may include updates for the HD map 422, such as information regarding construction sites, potholes, detours, flooding, and/or other obstructions. In some examples, the neural networks 492, the updated neural networks 492, and/or the map information 494 may have resulted from new training and/or experiences represented in data received from any number of vehicles in the environment, and/or based on training performed at a datacenter (e.g., using the server(s) 478 and/or other servers).

The server(s) 478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 490, and/or the machine learning models may be used by the server(s) 478 to remotely monitor the vehicles.

In some examples, the server(s) 478 may receive data from the vehicles and apply the data to up-to-date real-time neural networks for real-time intelligent inferencing. The server(s) 478 may include deep-learning supercomputers and/or dedicated AI computers powered by GPU(s) 484, such as a DGX and DGX Station machines developed by NVIDIA. However, in some examples, the server(s) 478 may include deep learning infrastructure that use only CPU-powered datacenters.

The deep-learning infrastructure of the server(s) 478 may be capable of fast, real-time inferencing, and may use that capability to evaluate and verify the health of the processors, software, and/or associated hardware in the vehicle 400. For example, the deep-learning infrastructure may receive periodic updates from the vehicle 400, such as a sequence of images and/or objects that the vehicle 400 has located in that sequence of images (e.g., via computer vision and/or other machine learning object classification techniques). The deep-learning infrastructure may run its own neural network to identify the objects and compare them with the objects identified by the vehicle 400 and, if the results do not match and the infrastructure concludes that the AI in the vehicle 400 is malfunctioning, the server(s) 478 may transmit a signal to the vehicle 400 instructing a fail-safe computer of the vehicle 400 to assume control, notify the passengers, and complete a safe parking maneuver.

For inferencing, the server(s) 478 may include the GPU(s) 484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Figure 5:
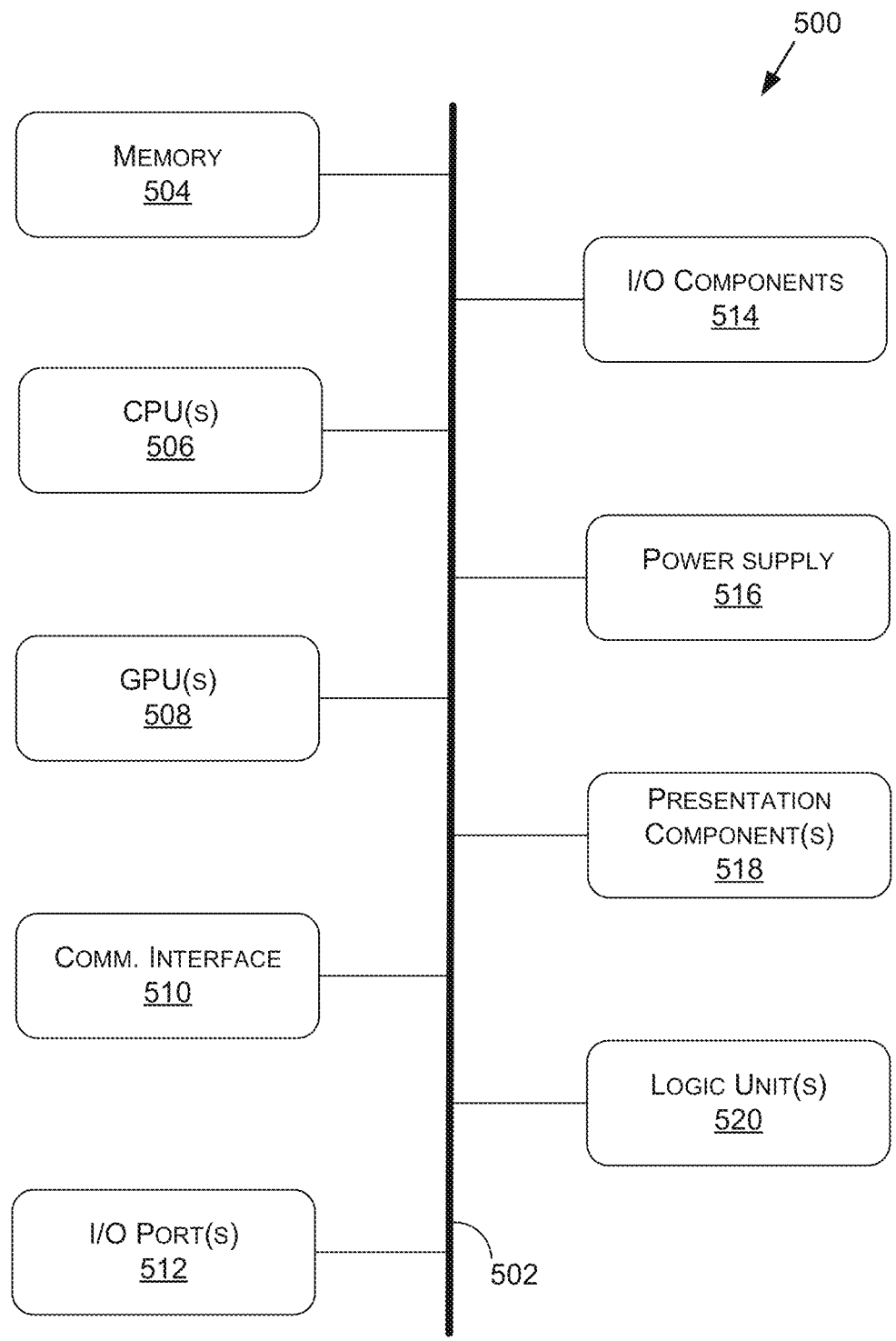
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, I/O ports 512, input/output components 514, a power supply 516, one or more presentation components 518 (e.g., display(s)), and one or more logic units 520.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point, connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, including wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 512 may enable the computing device 500 to be logically coupled to other devices including the I/O components 514, the presentation component(s) 518, and/or other components, some of which may be built into (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 6:
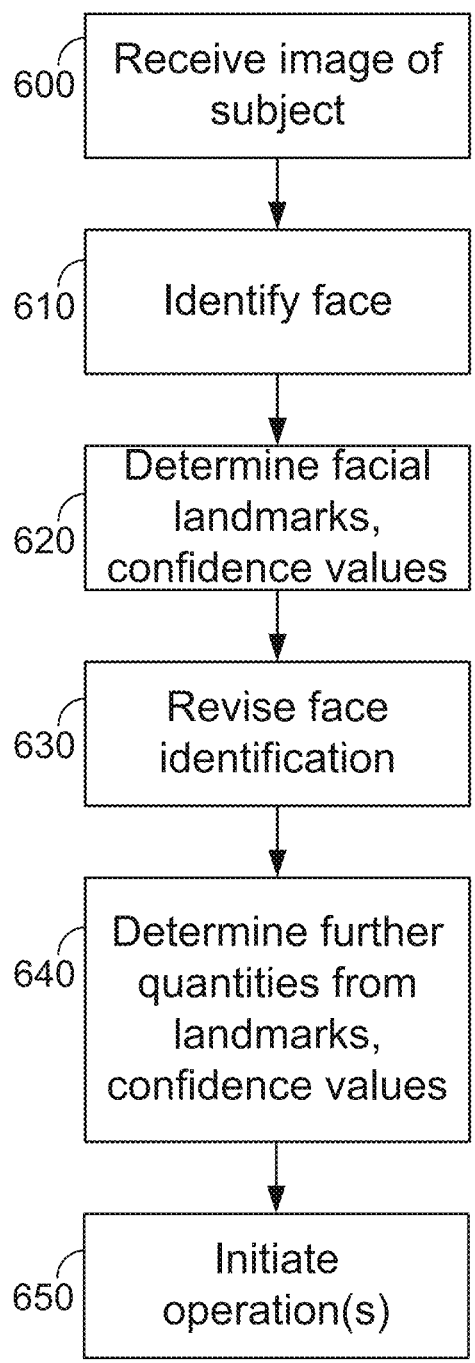
FIG. 6 is a flowchart illustrating process steps for determining and using landmark and confidence values of a subject, in accordance with embodiments of the disclosure.

Now referring to FIG. 6, each block of methods described in FIG. 6, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods of FIG. 6 are described, by way of example, with respect to the example autonomous vehicle system of FIGS. 4A-4D. However, these methods may additionally or alternatively be executed by any one system, or any combination of systems, including, but not limited to, those described herein.

FIG. 6 is a flowchart illustrating process steps for determining landmark and confidence values in accordance with embodiments of the disclosure. The process of FIG. 6 may begin when the computing device 300 receives an image of a subject taken by camera 300 (Step 600). Computing device 300 then identifies the face and eyes of the subject in the received image (Step 610). Subject faces may be located within an image using any method or process, including known computer vision-based face detection processes that detect faces without using neural networks, such as edge detection methods, feature searching methods, probabilistic face models, graph matching, HOGs fed into classifiers such as support vector machines, HaarCascade classifiers, and the like. Face location may also be performed using neural network-based facial recognition methods such as those employing deep DNN facial recognition schemes, as well as any others. Embodiments of the disclosure also contemplate location of the subject's eyes from the same image. Eye location can be carried out in any manner, such as by known computer vision-based eye detection processes including any of the above non-neural network based techniques, neural network-based eye recognition methods, and the like.

Once the face and eyes of the subject are located within the received image, computing device 300 determines landmarks and confidence values of the located face (Step 620). Facial landmarks may be any points or locations corresponding to characteristic elements or representative portions of a face, and may be identified using any method or process. Facial landmarks may be located within an image using any known computer vision-based landmark detection processes that identify landmarks without using neural networks, such as edge detection methods, feature searching methods, probabilistic face models, graph matching, HOGs fed into classifiers such as support vector machines, HaarCascade classifiers, and the like. Landmark detection may also be performed using neural network-based facial recognition methods such as those employing DNN-based facial recognition schemes, as well as any others. Confidence values may be determined in any manner, such as by output of confidence values may be or correspond to confidence scores generated by the classifier in determining landmark classifications.

Once landmark and confidence values are determined, the face identification of Step 610 may be revised (Step 630). Confidence values can be used to improve face detection by indicating which portions of the subject's face are occluded. More specifically, computing device 300 may use confidence values to select only those portions of a face which are sufficiently non-occluded. Computing device 300 may, for example, re-draw the bounding box around only non-occluded portions of the subject's face, so that the output of the face detection module 210 of FIG. 2 is a crop of only those portions of the subject's face which are not occluded. In this manner, determination of subject states such as gaze may focus on only those facial features which appear clearly in the subject's image, thus potentially generating more accurate results.

Facial landmarks and confidence values may also be transmitted to any other models, to determine any further quantities therefrom (Step 640). For example, landmarks and confidence values may be transmitted to any gaze-assisted system 320 for determination of gaze and other quantities as above. In turn, any operations of any system may be initiated in response to the quantities determined in Step 640 (Step 670).

Training of any of the models of embodiments of the disclosure may be conducted in any suitable manner. In certain embodiments, the models of embodiments of the disclosure may be trained in supervised manner using images of subjects in various states of occlusion, where corresponding facial features are labeled as occluded or not occluded, such as with a binary occlusion/non-occlusion flag or with occlusion as a continuous quantity. In at least one embodiment, any backpropagation process, using any loss function, may be used to train the models of embodiments of the disclosure. Backpropagation may be performed using only non-occluded points, e.g., with loss not taken on occluded points. Alternatively, loss functions may take occluded points into account. In some embodiments, the facial landmarks network 220 may be trained separately, according to any loss function that may be a function of any one or more of the outputs of network 220. In other embodiments, each of the networks 220, 230, 240, and 250, that is, the facial landmarks network 220 and any downstream networks, may be trained end to end.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, facial landmarks and confidence values may be determined in any manner, and may be used along with any other associated information to determine any characteristic or attribute of the subject. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:
   determining, using one or more machine learning models (MLMs), and based at least on first image data representing a first portion of an image, one or more landmark points for a subject at least partially depicted in the first portion;
   determining one or more confidence values corresponding to amounts of occlusion depicted in the first portion of the image corresponding to the one or more landmark points;
   selecting a second portion of the image based at least on one or more portions of the subject in the image detected using the one or more confidence values;
   computing one or more properties of the subject based at least on analyzing second image data representing the second portion of the image; and
   initiating one or more operations of a machine based at least on the one or more properties of the subject.

2. The method of claim 1, wherein the one or more machine learning models are trained to infer the one or more landmark points and the one or more confidence values.

3. The method of claim 1, wherein the one or more landmark points are first one or more landmark points, and the computing includes determining second one or more landmark points for the subject using the second image data, wherein the one or more properties are based at least on the second one or more landmark points.

4. The method of claim 1, wherein the first portion of the image corresponds to a region of a face detected in the image.

5. The method of claim 1, wherein the first portion of the image corresponds to a detection of one or more portions of the subject in the image, and the selecting of the second portion of the image is based at least on using the one or more confidence values as feedback on the detection.

6. The method of claim 1, wherein the one or more machine learning models are first one or more machine learning models, and the computing of the one or more properties includes applying one or more portions of the second image data to second one or more machine learning models to determine the one or more properties of the subject.

7. The method of claim 1, wherein the one or more properties indicate at least one of:
   a gaze direction of the subject,
   a head pose of the subject,
   a drowsiness state of the subject,
   a cognitive load of the subject, or
   a distraction state of the subject.

8. The method of claim 1, further comprising monitoring a state of the subject based at least on the one or more properties, wherein the initiating one or more operations of a machine comprises initiating one or more operations of the machine based at least on the state of the subject.

9. The method of claim 1, wherein the one or more machine learning models are first one or more machine learning models, and only the second image data is transmitted for use by second one or more machine learning models.

10. The method of claim 1, wherein the machine comprises an autonomous or semi-autonomous vehicle, and the initiating one or more operations comprises initiating one or more operations of autonomous or semi-autonomous vehicle based at least on the one or more properties of the subject.

11. A system comprising:
   one or more processing units to perform operations comprising:
      applying first image data representing a first portion of an image depicting at least a portion of a subject to one or more machine learning models to determine one or more landmark points for the subject and one or more confidence values corresponding to amounts of occlusion of portions of the subject corresponding to the one or more landmark points;
      selecting a second portion of the image based at least on one or more portions of the subject in the image detected using the one or more confidence values; and
      determining one or more properties of the subject based at least on an analysis of second image data representing the second portion of the image.

12. The system of claim 11, wherein the one or more machine learning models are trained to infer the one or more landmark points and the one or more confidence values.

13. The system of claim 11, wherein the one or more landmark points are first one or more landmark points, and the determining of the one or more properties includes determining second one or more landmark points for the subject using the second image data, wherein the one or more properties are based at least on the second one or more landmark points.

14. The system of claim 11, wherein the first portion of the image corresponds to a region of a face detected in the image.

15. The system of claim 11, wherein the first portion of the image corresponds to a detection of one or more portions of the subject in the image, and the selecting of the second portion of the image is based at least on using the one or more confidence values as feedback on the detection.

16. The system of claim 11, further comprising initiating one or more operations of an autonomous vehicle based at least on the one or more properties of the subject.

17. A processor comprising:
   one or more circuits to determine one or more properties of a subject in an image based at least on an analysis of first image data representing a first portion of the image, the one or more properties being determined based at least on:
      applying second image data representing a second portion of the image depicting at least a portion of the subject to one or more machine learning models (MLMs) to determine one or more landmark points for the subject and one or more confidence values corresponding to amounts of occlusion of portions of the subject corresponding to the one or more landmark points, and
      selecting the first portion of the image based at least on one or more portions of the subject in the image detected using the one or more confidence values.

18. The processor of claim 17, wherein the one or more machine learning models are trained to infer the one or more landmark points and the one or more confidence values.

19. The processor of claim 17, wherein the one or more landmark points are first one or more landmark points, and the analysis of the first image data includes determining second one or more landmark points for the subject using the first image data, wherein the one or more properties are based at least on the second one or more landmark points.

20. The processor of claim 17, wherein the one or more circuits are further to perform one or more operations of an autonomous vehicle based at least on the one or more properties of the subject.

* * * * *